US008935961B2

(12) United States Patent
Papadeas et al.

(10) Patent No.: US 8,935,961 B2
(45) Date of Patent: Jan. 20, 2015

(54) COMBINATION PRESSURE/TEMPERATURE IN A COMPACT SENSOR ASSEMBLY

(75) Inventors: Nicholas G. Papadeas, Franklin, MA (US); Jeffrey Peter Silveria, North Attleboro, MA (US); Omar Rashid Ghani, Pawtucket, RI (US); Jared E. Girroir, Guilford, UT (US); Albert Ferdinand Zwijze, Vriezenveen (NL); Paulus Thomas Johannes Gennissen, Markelo (NL); Edward Norberg, Pawtucket, RI (US)

(73) Assignee: Sensata Technologies, Inc., Attleboro, MA (US)

( * ) Notice: Subject to any disclaimer, the term of this patent is extended or adjusted under 35 U.S.C. 154(b) by 342 days.

(21) Appl. No.: 13/571,433

(22) Filed: Aug. 10, 2012

(65) Prior Publication Data
US 2013/0047736 A1 Feb. 28, 2013

Related U.S. Application Data

(60) Provisional application No. 61/524,989, filed on Aug. 18, 2011.

(51) Int. Cl.
*G01L 7/00* (2006.01)
*G01L 19/00* (2006.01)
*G01L 19/14* (2006.01)
*G01D 11/24* (2006.01)

(52) U.S. Cl.
CPC ......... *G01L 19/0038* (2013.01); *G01L 19/0092* (2013.01); *G01L 19/147* (2013.01); *G01D 11/245* (2013.01)

USPC ............................. 73/714; 73/753; 361/283.1

(58) Field of Classification Search
None
See application file for complete search history.

(56) References Cited

U.S. PATENT DOCUMENTS

| 4,274,125 | A | * | 6/1981 | Vogel | 361/283.3 |
|---|---|---|---|---|---|
| 5,000,048 | A | * | 3/1991 | Kordts | 73/708 |
| 7,591,186 | B1 | * | 9/2009 | Boyer | 73/756 |
| 7,992,445 | B2 | * | 8/2011 | Kobayashi et al. | 73/724 |
| 8,069,729 | B2 | * | 12/2011 | Dannhauer et al. | 73/708 |

* cited by examiner

*Primary Examiner* — Lisa Caputo
*Assistant Examiner* — Jermaine Jenkins
(74) *Attorney, Agent, or Firm* — Chapin IP Law, LLC

(57) ABSTRACT

A sensor assembly includes a rectangular-shaped pressure sensor element and an electronic circuitry coupled to receive a signal from the pressure sensor element. An open-ended fluid-tight passageway of the sensor assembly conveys fluid from a portal opening of the sensor assembly to a surface of the rectangular-shaped pressure sensor element. The sensor assembly further includes a closed-ended fluid-tight passageway, at least a portion of which is fabricated from metal. The closed-ended fluid tight passageway extends from at least from the portal opening of the sensor assembly to the electronic circuitry on at least a portion of a path adjacent to the rectangular-shaped ceramic pressure sensor element. The sensor assembly includes a temperature sensor element disposed in an end of the closed-ended fluid-tight passageway. Conductive links disposed in the closed-ended fluid tight passageway electrically couple the temperature sensor element to the electronic circuitry.

21 Claims, 7 Drawing Sheets

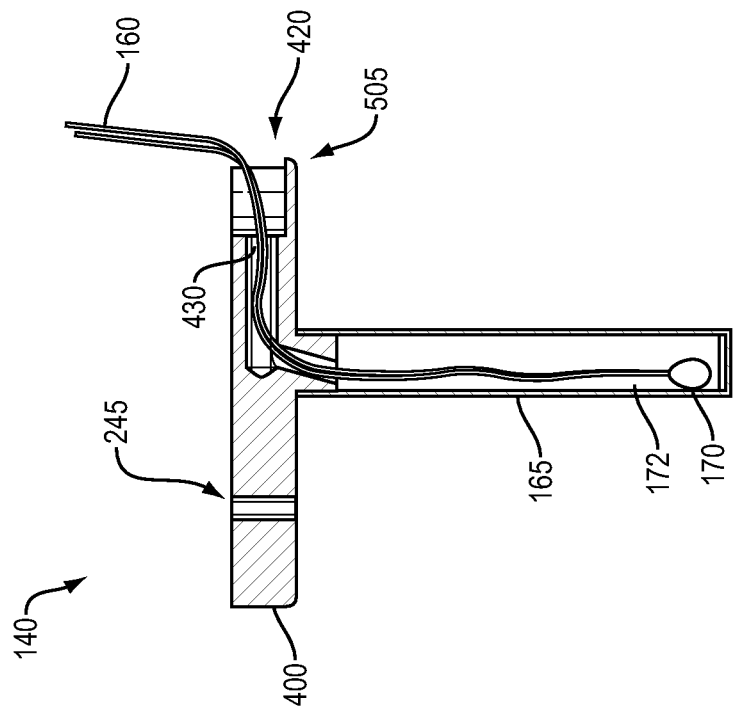
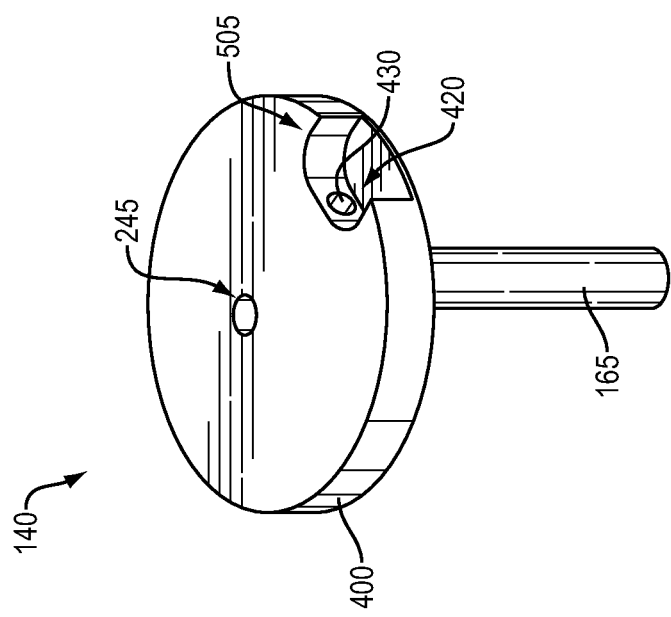

COMBINATION PRESSURE/TEMPERATURE IN A COMPACT SENSOR ASSEMBLY

CROSS REFERENCE TO RELATED APPLICATIONS

The present application claims the benefit of U.S. Provisional Patent Application No. 61/524,989, filed on Aug. 18, 2011, which is incorporated herein by reference.

BACKGROUND

Conventional sensor devices have been used to measure environmental conditions. For example, via signal information generated by a conventional pressure sensor device, it is possible to monitor and electrically convey pressure conditions to a remote location over a wired link. An example of a pressure sensor assembly is shown in U.S. Pat. No. 4,875,135 granted to Bishop. In certain cases, conventional sensor devices include both a temperature sensor and a pressure sensor to measure both a temperature and a pressure of a respective environment. Examples of combination pressure/temperature sensor assemblies are shown in U.S. Pat. No. 5,974,893, U.S. Pat. No. 7,000,478, U.S. Pat. No. 7,762,140, U.S. Pat. No. 4,716,492, U.S. Pat. No. 7,434,470 and U.S. Patent Publication No. 2010/0002745A1.

One type of conventional pressure/temperature sensor assembly includes multiple components. For example, a conventional pressure sensor assembly can include a metal base component including threads in order to mount the pressure sensor assembly to a host device such as an engine block. The metal base component of the pressure sensor assembly can include a cup or hollowed region in which to house respective pressure/temperature sensor electronics, temperature sensor element, and a pressure sensor element.

The sensor electronics in the pressure sensor assembly can be configured to receive a signal from the pressure sensor element (e.g., a capacitive sense element, resistive sense element, etc.) and/or temperature sensor element (e.g., a thermistor, therocouple, etc.). The sensor elements detect an environmental condition and convey appropriate electrical signals to the electronic circuitry in the sensor assembly. The signals transmitted from the sensor elements to the pressure sensor electronics varies depending on the sensed environmental condition of the fluid.

In addition to the metal base component, a typical sensor assembly can further include a connector component electrically coupled to the pressure sensor electronics. Typically, at least a portion of the connector component can be fitted into the cup region of the pressure sensor assembly to hold and further protect the pressure sensor electronics in the cup from harmful environmental elements. A portion of the connector assembly opposite the portion in the cup can be exposed outside the cup to accept an end of a wire on which to convey the pressure information to a remote location. In certain cases, a portion of the base component is crimped to secure the connector to the base component of the sensor device. The end of the connector that is crimped to the base component retains a pressure sensor element and respective processing circuitry within the cup.

Subsequent to processing signals received from the pressure sensor element and the temperature sensor element, the electronics typically produces one or more output signals that are transmitted through the connector of the pressure sensor assembly to a remote location.

As mentioned above, conventional sensor assemblies have been configured to include both a pressure sensor element to sense pressure and a temperature sensor element to sense temperature of a fluid. However, such conventional devices are typically expensive to manufacture, are large in size, and are subject to damage.

For example, one conventional sensor assembly includes a circular ceramic pressure sensor element and a temperature sensor element. In such an assembly, respective leads of the temperature sensor element pass though a hole bored in the circular pressure sensor element. Circular pressure sensor elements are expensive and difficult to manufacture. Forming a hole in the circular pressure sensor element can be costly as it requires rather precise hole location.

Another conventional sensor assembly includes a temperature sensor element and respective leads that are effectively coated with plastic via one or more injection molding processes. In such an embodiment, when assembled in a pressure/temperature sensor device, the plastic coated temperature sensor element extends beyond a port of the sensor assembly that receives a fluid for monitoring. A drawback of such a design is that the plastic coating on the temperature sensor element does not provide a high degree of protection against damage. For example, when the sensor assembly including the plastic coated temperature sensor element is dropped from a height of one meter, the plastic coated temperature sensor element can easily crack. If the sensor assembly is then used in an intended application to monitor pressure/temperature of a caustic fluid, the temperature sensor element would be exposed to the fluid causing damage.

One way to make the conventional sensor assembly more robust is to produce an injection mold of the temperature sensor element with a thicker coating. This may increase its strength; however, the sensor assembly becomes very large in size.

Additionally, depending on the application, it may be desirable to change a length at which the temperature sensor element extends beyond the port of the sensor assembly that receives the fluid for monitoring. Use of an injection molding processor to create a coating to protect the temperature sensor element is undesirable because any adjustments to the length will require a new injection mold. This is undesirable as injection molds are expensive.

BRIEF DESCRIPTION

Embodiments herein deviate with respect to conventional sensor assemblies. For example, in contrast to conventional systems, certain embodiments herein are directed to reducing a size of a pressure/temperature sensor assembly, while providing a highly robust assembly that can survive a drop test without being damaged. As discussed below, among multiple techniques that facilitate producing a smaller sized, easily assembled, and physically more robust sensor assembly, embodiments herein can include use of a rectangular-shaped pressure sensor element, metallic probes, etc.

More specifically, in one embodiment, a sensor assembly includes a rectangular-shaped pressure sensor element (i.e. ceramic pressure sensor element) and an electronic circuitry coupled to receive a signal from the rectangular-shaped pressure sensor element. The pressure sensor element senses a pressure of a fluid. The sensor assembly can include an open-ended fluid-tight passageway in which to convey the fluid from a portal opening of the sensor assembly to a surface of the rectangular-shaped pressure sensor element that senses the pressure. The sensor can further include a closed-ended fluid-tight passageway, at least a portion of which is fabricated from a material such as metal. In contrast to the open-ended fluid tight passageway, the closed-ended fluid tight passageway prevents physical exposure to the fluid being monitored. The closed-ended fluid tight passageway extends from at least from the portal opening of the sensor assembly to the electronic circuitry on at least a portion of a path adjacent to the rectangular-shaped pressure sensor element. The sensor assembly can further include a temperature sensor element disposed in an end of the closed-ended fluid-tight passageway nearer the portal opening. At least one conductive link disposed in the closed-ended fluid tight passageway can electrically couple the temperature sensor element to the electronic circuitry.

In accordance with further embodiments, to provide better thermal response, the sensor assembly can include thermally conductive filling disposed in at least a portion of the closed-ended fluid-tight passageway. The thermally conductive filling provides a thermally conductive path between the temperature sensor element and the end of the closed-ended fluid-tight passageway in which the temperature sensor element resides. The end of the closed-ended fluid tight passageway can include a hollowed metal probe or tube in which the temperature sensor element resides. Because it is closed and fluid-tight, the hollowed metal probe prevents exposure of the temperature sensor element inside of the tube to the fluid. The hollowed metal probe can be made of any suitable material such as stainless steel, brass, etc. depending on the type of fluid that is being measured.

In contrast to use of injection molds as discussed above in conventional applications, the hollowed metal probe according to embodiments herein also can be made of any suitable length without the need to create a costly injection mold.

In the sensor assembly, an external surface of the end (e.g., a hollow probe section including a temperature sensor element) of the closed-ended fluid tight passageway can be exposed to fluid. The closed-ended fluid tight passageway prevents the electronic circuitry, the one or more conductive links, the electronic circuitry, etc., from being exposed to the fluid. In contrast, the open-ended fluid tight passageway provides a conduit in which to convey the fluid from a portal opening of the sensor assembly to a surface of the pressure sensor element.

In accordance with yet further embodiments, an end of the hollowed metal probe (at an end of the closed-ended fluid tight passageway) in which the temperature sensor element resides extends beyond the portal opening of the sensor assembly such that the temperature sensor element in the hollowed metal probe detects a temperature of a fluid sample at a location external to the open-ended fluid tight passageway.

The sensor assembly can include a male-threaded base component. A first end of the male threaded base component can include the portal opening and a circular bore in which to receive and convey the fluid to the rectangular-shaped pressure sensor element. The circular bore at the first end of the male-threaded base component can form at least part of the open-ended fluid tight passageway. A second end of the male-threaded base component including a circular-bored hollowed volume in which to house at least the electronic circuitry and the rectangular-shaped ceramic pressure sensor element. As mentioned, at least a portion of the hollowed metal probe of the sensor assembly can reside in and extend through the circular bore at the first end of the male-threaded base component.

The rectangular-shaped pressure sensor element can be diced from a wafer of multiple pressure sensor elements.

Further embodiments as discussed herein include a so-called mid-plate assembly. The mid-plate assembly can include a combination of at least a disk-shaped element and a tubular element, the tubular element disposed substantially orthogonal to surface planes of the disk-shaped element in the mid-plate assembly. The disk-shaped element of the mid-plate assembly can be disposed in the sensor assembly between the rectangular-shaped pressure sensor element and the end of the portal opening of the sensor assembly.

The temperature sensor element can reside at an end of the tubular element of the mid-plate assembly. Conductive links such as insulated wires, traces, etc., extend from the temperature sensor element, through the tubular element and the disk-shaped element to a location near a circumferential edge of the disk-shaped element. The conductive links can further extend from the circumferential edge of the disk-shaped element around the rectangular-shaped pressure sensor element to the electronic circuitry.

As further described herein, the mid-plate assembly can include a first hollowed volume through the disk-shaped element. In such an instance, the first hollowed volume forms a portion of the open-ended fluid tight passageway between the portal opening and the surface of the rectangular-shaped pressure sensor element.

The mid-plate assembly can include a second hollowed volume through the disk-shaped element. The second hollowed volume forming a portion of the close-ended fluid tight passageway between the portal opening and the electronic circuitry. In one embodiment, at least a portion of the second hollowed volume is a bore whose axis is generally orthogonal to a lengthwise axis of the tubular element.

The disk-shaped element can include a notch on a circumferential edge into which an end of the second hollowed volume terminates. The temperature sensor element resides at an end of the tubular element in the mid-plate assembly. Conductive links extend from the temperature sensor element, through the tubular element and the second hollowed volume in the disk-shaped element, through the notch and on the path adjacent the rectangular-shaped pressure sensor element to the electronic circuitry.

In accordance with further embodiments, the sensor assembly can include a mid-plate assembly comprising a first disk-shaped element and a second disk-shaped element. The first disk-shaped element can include a hole there through. The second disk-shaped element can include a hole and a probe disposed substantially orthogonal to a surface plane of the first disk-shaped element. The disk-shaped element of the mid-plate assembly can be disposed in the sensor assembly between the rectangular-shaped pressure sensor element and the end of the portal opening of the sensor assembly.

The first disk-shaped element and the second disk-shaped element can be stamped metal. The orthogonal probe can be drawn from a portion of the second disk-shaped element. In other words, the probe in the second disk-shaped element can be formed based on reshaping or stretching a portion of metal in the disk-shaped element.

The mid-plate assembly can further include a spacing between the first disk-shaped element and the second disk-shaped element. Each of the first disk-shaped element and the second disk-shaped element can include a hole forming part of the open-ended fluid tight passageway. As mentioned, the temperature sensor element can be disposed in the probe—the probe and the spacing between disk elements can form at least part of the closed-ended fluid tight passageway as discussed above.

Another embodiment herein includes a disk-shaped element and a hollow probe element. The disk-shaped element includes a first surface plane and a second surface plane. The hollow probe element is attached to and disposed substantially orthogonal with respect to the first surface plane of the disk-shaped element. The disk-shaped element includes a first hollowed volume extending from the first surface plane to the second surface plane to allow passage of a fluid to a pressure sensor element in a sensor assembly. The disk-shaped element further includes a second hollowed volume extending radially outward from the probe element to a circumferential location of disk-shaped element, a combination of the hollow probe element and the second hollowed volume are part of the closed-ended fluid tight passageway as discussed herein.

Another embodiment of the sensor assembly as discussed herein includes a threaded base component in which to attach the sensor assembly to a resource such as an engine block. The threaded base component includes a first hollowed volume and a second hollowed volume such as a bore. The first hollowed volume forms at least part of the open-ended fluid tight passageway; the second hollowed volume forms at least part of the closed-ended fluid tight passageway.

In accordance with this last embodiment, the first hollowed volume can be a substantially straight path extending from the portal opening of the sensor assembly towards the surface of the rectangular-shaped pressure sensor element. The first hollowed volume can convey the fluid from the portal opening to the rectangular-shaped pressure sensor element. The second hollowed volume can be a multi-segmented path including a first segment that is substantially parallel to the straight path and a second segment that diverts the second hollowed volume radially outwards.

Additional embodiments of the sensor assembly as discussed herein include a threaded base component in which to attach the sensor assembly to resource. The threaded base component includes a first hollowed volume and a second hollowed volume. The first hollowed volume forms part of the open-ended fluid tight passageway. The second hollowed volume forms part of the closed-ended fluid tight passageway.

In accordance with such an embodiment, the first hollowed volume can be a straight path extending from the portal opening of the sensor assembly towards the surface of the rectangular-shaped pressure sensor element. The first hollowed volume conveys the fluid from the portal opening to the rectangular-shaped pressure sensor element. The second hollowed volume can be a multi-segmented path including a first segment that is substantially parallel to the straight path and a second segment that diverts the second hollowed volume radially outwards. A probe section attached to the end of the second hollowed volume nearest the portal opening. In one embodiment, the probe section extends the closed-ended fluid tight passageway beyond the first hollowed volume.

These and other embodiment variations are discussed in more detail below.

As mentioned above, note that embodiments herein can include a configuration of one or more computerized devices, hardware processor devices, assemblers, or the like to carry out and/or support any or all of the method operations disclosed herein. In other words, one or more computerized devices, processors, digital signal processors, assemblers, etc., can be programmed and/or configured to perform the method as discussed herein.

Additionally, although each of the different features, techniques, configurations, etc., herein may be discussed in different places of this disclosure, it is intended that each of the concepts can be executed independently of each other or in combination with each other. Accordingly, the one or more present inventions, embodiments, etc., as described herein can be embodied and viewed in many different ways.

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

FIG. 4 is an example perspective view of a mid-plate assembly according to embodiments herein.

FIG. 5 is an example cross-section view of a mid-plate assembly according to embodiments herein.

Figure 1:
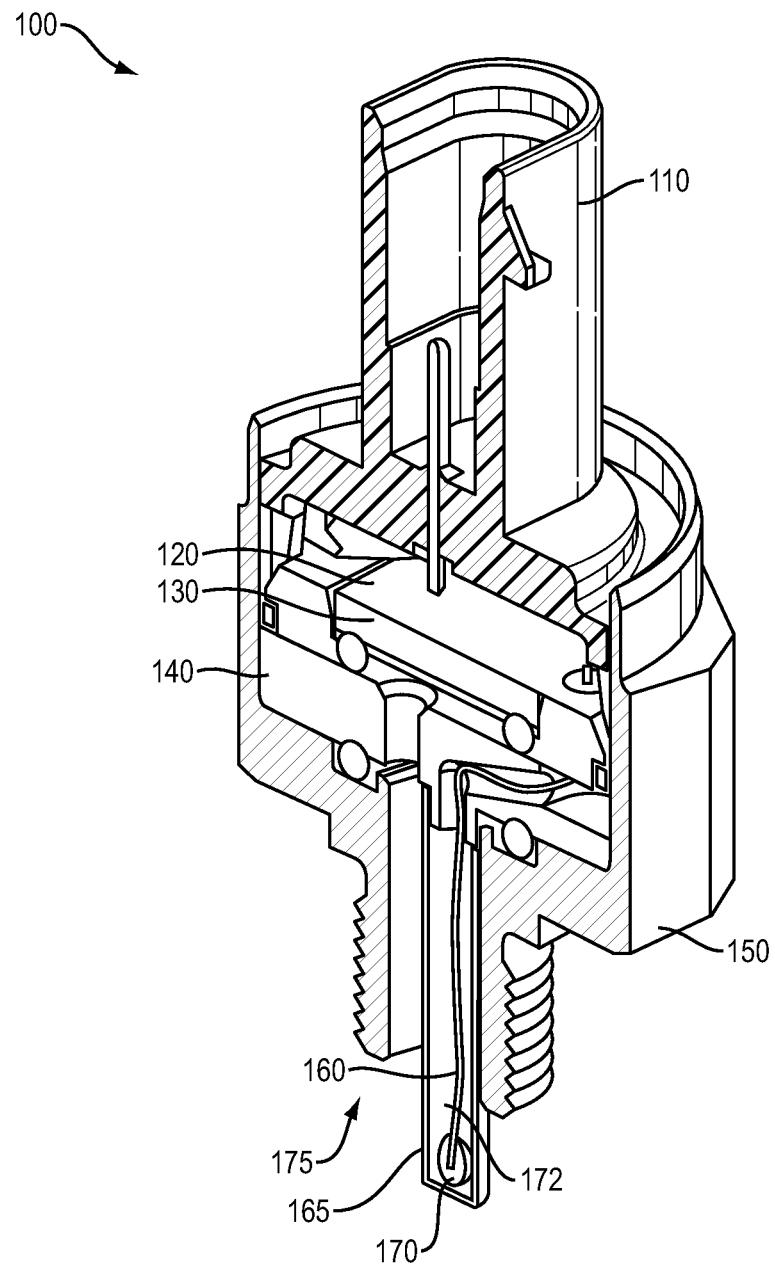
FIG. 1 is an example cutaway perspective view of a sensor assembly including pressure sensor element and temperature sensor element according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

As discussed above, embodiments herein deviate with respect to conventional sensor assemblies. For example, in contrast to conventional systems, certain embodiments herein are directed to reducing a size of a pressure/temperature sensor assembly, while providing a highly robust sensor assembly that can survive a drop test without being damaged.

More specifically, FIG. 1 is an example cutaway perspective view of a sensor assembly including pressure sensor element and temperature sensor element according to embodiments herein.

As shown, sensor assembly 100 includes a rectangular-shaped pressure sensor element 130 (to sense a pressure of a fluid) and electronic circuitry 120 coupled to receive a signal from the pressure sensor element 130.

Although embodiments herein discuss use of a rectangular-shaped pressure sensor element, other suitable types of pressure sensor elements can be used in sensor assembly. The use of the rectangular-shaped pressure sensor element allows for making the sensor assembly smaller than prior art devices, thereby saving money and space. A preferred rectangular-shaped pressure sense element would be 15 millimeters by 13 millimeters or less in size. In one embodiment, the pressure sensor element 130 is a capacitive pressure sensor element.

However, any suitable type of pressure sensor element can be used in pressure sensor assembly 100.

The sensor assembly 100 includes an open-ended fluid-tight passageway in which to convey the fluid from a portal opening 175 of the sensor assembly 100 to a surface (e.g., bottom surface in the example figure) of the pressure sensor element 130 that senses the pressure. As its name suggests, the end of the open-ended fluid tight passageway is open to receive and convey the fluid to the sensing surface of pressure sensor element 130. The passageway is fluid-tight to prevent leakage and exposure of the fluid to other components in the sensor assembly 100.

In one embodiment, the rectangular-shaped pressure sensor element is diced from a wafer of multiple pressure sensor elements. However, as mentioned, note that any suitable type of pressure sensor element can be used herein.

The sensor assembly 100 further can include a closed-ended fluid-tight passageway, preferably at least a portion of which is fabricated from metal. In contrast to the open-ended fluid tight passageway that conveys the fluid from portal opening 175, the closed-ended fluid tight passageway prevents exposure the fluid to any of the items (e.g., temperature sensor element 170, one or more conductive links 160, etc.) in the closed-ended fluid tight passageway. Thus, the closed-ended fluid tight passageway acts as a shield to prevent exposure of the fluid to components in the sensor assembly 100.

In one embodiment, the temperature sensor element 170 is a surface mount device. The conductive leads 160 can be a flexible circuit board.

In one embodiment, the closed-ended fluid tight passageway extends from at least from the portal opening 175 of the sensor assembly 100 to the electronic circuitry 120 on at least a portion of a path adjacent to the pressure sensor element 130.

As mentioned and as shown, the sensor assembly 100 can further include a temperature sensor element 170 disposed in an end (e.g., tubular element 165) of the closed-ended fluid-tight passageway nearer the portal opening 175. This allows improved rapid heat transfer from the fluid medium to the temperature sensor.

The one or more conductive links 160 (e.g., multiple insulated wires, circuit traces of a flexible circuit board, etc.) disposed in the closed-ended fluid tight passageway electrically couple the temperature sensor element 170 to the electronic circuitry 120.

Note that, in one embodiment, the sensor assembly 100 includes thermally conductive material 172. The thermally conductive material 172 disposed in at least a portion of the closed-ended fluid-tight passageway such as the tubular element 165. In accordance with such an embodiment, the thermally conductive material 172 (e.g., filling) that fills tubular element 165, providing a thermally conductive path (and potentially electrically insulated path) between the temperature sensor element 170 and the end of the closed-ended fluid-tight passageway (e.g., tubular element 165) in which the temperature sensor element 170 resides.

The tubular element 165 can be made from any suitable type of metal material such as stainless steel, brass, copper, etc. depending on the corrosive properties of the fluid being measured. Accordingly, in one embodiment, the closed-ended fluid tight passageway can include a hollowed metal probe (e.g., tubular element 165) in which the temperature sensor element 170 resides. As mentioned, the hollowed metal probe prevents exposure of the temperature sensor element 170 to the fluid being monitored. Exposure of the fluid to the temperature sensor element 170 may cause damage.

As shown, an external surface of the end (e.g., a hollow probe section including temperature sensor element 170) of the closed-ended fluid tight passageway is exposed to fluid. A temperature of the fluid is passed through the tubular element 165 and the thermally conductive material 172 to the temperature sensor element 170.

In one embodiment, as shown by way of non-limiting example only, note that an end of the tubular element 165 (e.g., a hollowed metal probe in which the temperature sensor element 130 resides) extends beyond the portal opening 175 of the sensor assembly 100 such that the temperature sensor element in the hollowed metal probe detects a temperature of a fluid sample at a location external to the open-ended fluid tight passageway of the sensor assembly 100. This maximizes rapid heat transfer from the fluid medium to the temperature sensor. In accordance with further embodiments, the tubular element 165 can terminate inside of portal opening 175.

The sensor assembly 100 can include a male-threaded base component 150 as shown. However, any other suitable coupling mechanism (e.g., other than threads) can be employed to attach the sensor assembly 100 to a respective host.

A first end (e.g., at portal opening 175) of the base component 150 (e.g., made from metal or other suitable material) can include the portal opening 175 formed at least in part via a circular bore in of the base component 150. The circular or cylindrical bore in base component 150 receives and conveys the fluid to the pressure sensor element 130.

In one embodiment, the circular bore at the end of the base component 150 forms at least part of the open-ended fluid tight passageway through sensor assembly 100. Note that a second end of the base component 150 includes a hollowed volume (e.g., circular bore) in which to house at least the electronic circuitry 120 and the pressure sensor element 130. As mentioned, at least a portion of the tubular element 165 of the sensor assembly 100 can reside in and extend, via a probe, through the circular bore of the base component 150.

Further embodiments as discussed herein include a so-called mid-plate assembly 140 (as further discussed in subsequent figures). In one embodiment, the mid-plate assembly 140 includes a combination of at least a disk-shaped element and tubular element 165. The tubular element 165 is disposed substantially orthogonal to surface planes of the disk-shaped element in the mid-plate assembly 140. As shown, at least a portion of the disk-shaped element of the mid-plate assembly 140 can be disposed in the sensor assembly 100 between the pressure sensor element 130 and the end of the portal opening 175 of the sensor assembly 100.

Note that a portion (e.g., the cylindrical bore inside threaded portion of base component 150) of the open-ended fluid tight passageway in the sensor assembly 100 can include tubular element 165 extending from the portal opening 175 in the sensor assembly 100. Thus, the tubular element 165 (e.g., part of the closed-ended fluid tight passageway) can reside within the cylindrical bore of the base component and extend through at least a portion of the open-ended fluid tight passageway.

Figure 2:
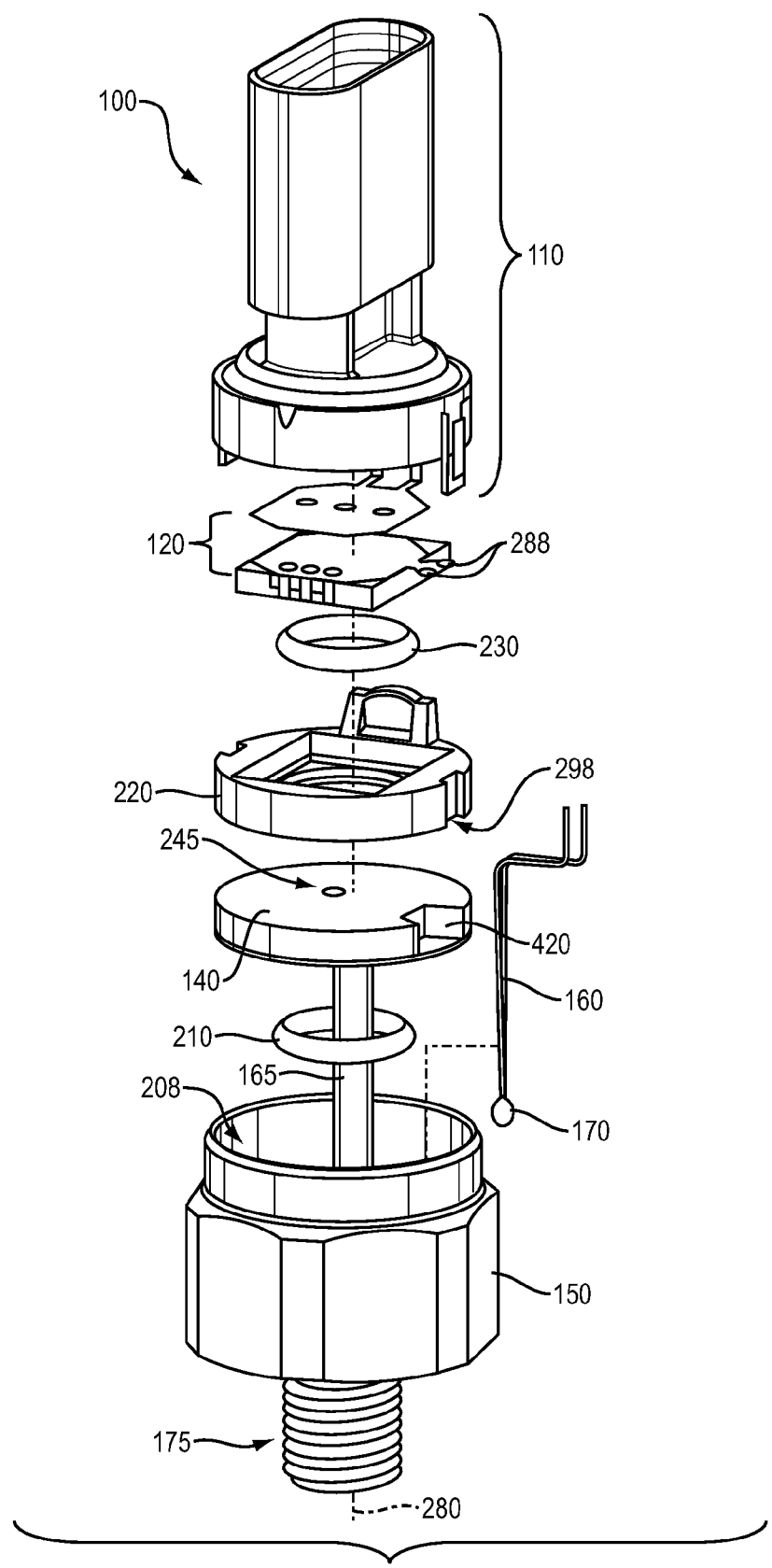
FIG. 2 is an example diagram illustrating an exploded view of components in a sensor assembly according to embodiments herein.

FIG. 2 is an example diagram illustrating an exploded view of components in a sensor assembly according to embodiments herein.

As shown, the sensor assembly 100 can include a number of components including a base component 150. The base component 150 includes a hollowed volume at portal opening 175 to convey the fluid along axis 280 towards the pressure sensor element 130. Sealing ring 210 provides a fluid-tight seal between base component 150 and a bottom surface of mid-plate assembly 140. Base component includes a hollowed volume 208 or cup in which at least the mid-plate assembly 140, retainer 220 (e.g., made of plastic, metal, etc.), pressure sensor element 130, electronic circuitry 120, and lower portion of connector 110 reside.

As its name suggests, retainer 220 aligns a combination of sealing ring 230, pressure sensor element 130, and electronic circuitry 120 above the upper surface of the mid-plate assembly 140.

Connector 110 couples to electronic circuitry 120 and enables transmission of pressure/temperature information to a remote location.

When assembled, components in the sensor assembly 100 create the open-ended fluid tight passageway. For example, the open-ended fluid tight passageway is formed via a combination of the bore at portal opening 175 in base component 150, inner portion of sealing ring 210, hollowed volume 245 through the mid-plate assembly, inner portion of sealing ring 230, and a bottom surface of the pressure sensor element 130.

Additionally, when assembled, components in the sensor assembly 100 create the closed-ended fluid tight passageway. For example, the closed-ended fluid tight passageway is formed via a combination of tubular element 165, a hollowed volume through the mid-plate assembly 140 to notch 420, and additional hollowed space (e.g., notch 298 in retainer 220) in the sensor assembly 100 that enables passage of the conductive links between the temperature sensor element 170 in the tubular element 165 and the electronic circuitry 120. In one embodiment, conductive links 160 connect to the temperature sensor element 170 at the end of tubular element 165 and pass through disk-shaped element of the mid-plate assembly 140 to terminals 288 of the electronic circuitry 120. Notch 420 and notch 298 provide a spacing to accommodate passage of the conductive links 160. Use of a rectangular-shaped pressure sensor element makes it possible to produce notch 298 in retainer 220 to accommodate the passage of conductive links 160.

Figure 3:
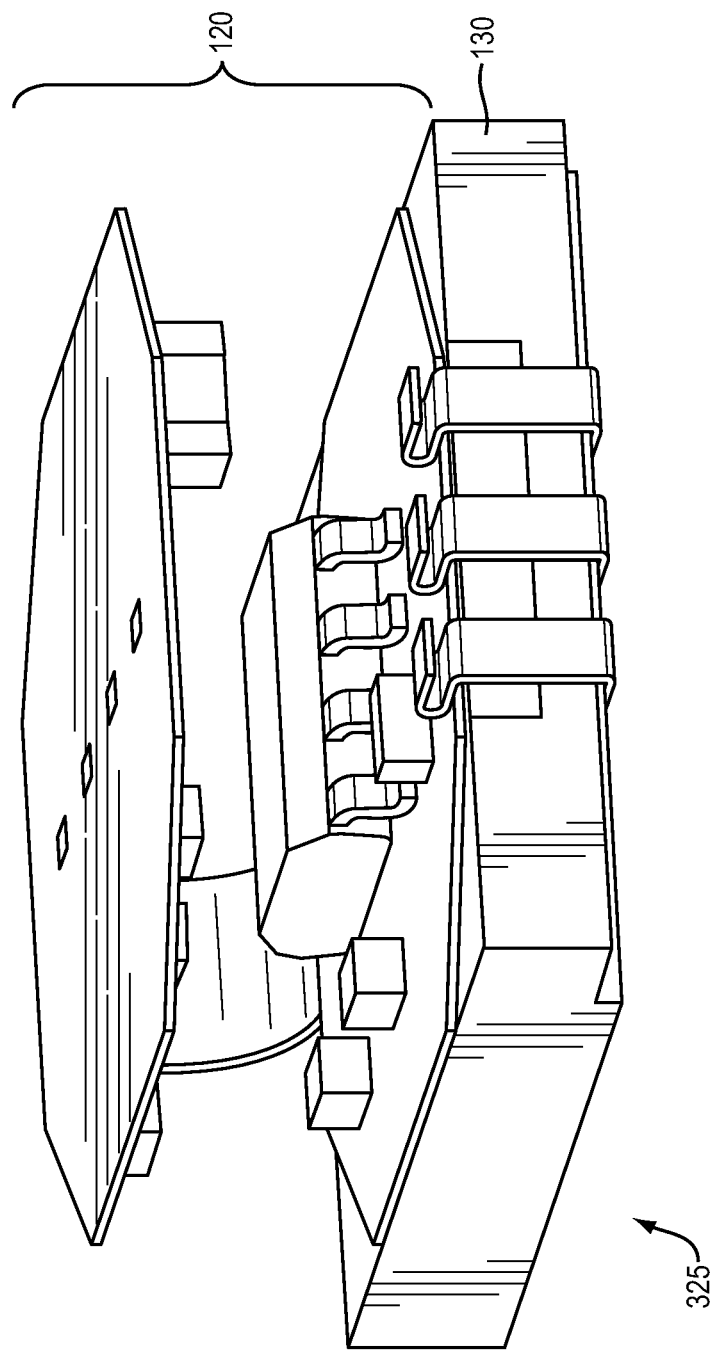
FIG. 3 is an example perspective diagram illustrating of an electronic circuitry and rectangular-shaped pressure sensor element according to embodiments herein.

FIG. 3 is an example perspective diagram illustrating of an electronic circuitry and rectangular-shaped pressure sensor element according to embodiments herein.

As shown, on a first surface, pressure sensor element 130 includes pressure sensing surface 325 in which to sense a pressure associated with the fluid being monitored. Opposite the pressure sensing surface 325 (e.g., at an end of the open-ended fluid tight passageway) resides electronic circuitry 120 to process signals received by the pressure sensor element 130 and the temperature sensor element 170.

FIG. 4 is an example perspective view of a mid-plate assembly according to embodiments herein.

As previously discussed, the temperature sensor element 170 can reside at an end of the tubular element 165 in the mid-plate assembly 140. When assembled, conductive links 160 such as a insulated wires, traces, etc., in the sensor assembly 100 extend from the temperature sensor element 170, through the tubular element 165 and the disk-shaped element 400 to a location near a circumferential edge 505 (e.g., near or around notch 420) of the disk-shaped element 400. As mentioned in previous figures, the conductive links 160 can further extend from the circumferential edge of the disk-shaped element 400 around or on an adjacent path with respect to the pressure sensor element 130 to the electronic circuitry 120.

In one embodiment, because the pressure sensor element 130 is rectangular-shaped, there is a space (e.g., notch 298) between the pressure sensor element 130 and the inner wall of the base component 150. This spacing provides the provide a pathway in which to route the conductive links 160 around the pressure sensor element 130 as opposed to though it. Using such a space makes it possible to create a smaller sized sensor assembly 100.

As further described herein, the mid-plate assembly 140 can include a hollowed volume 245 though the disk-shaped element 420 in which to convey the fluid from a bottom surface of the disk-shaped element 400 to a top surface of the disk-shaped element 400. In such an instance, the hollowed volume 245 forms a portion of the open-ended fluid tight passageway between the portal opening 175 and the pressure sensing surface 325 of the rectangular-shaped ceramic pressure sensor element 130. An inside of ring 210 on bottom surface of the disk-shaped element 400 and an inside of the ring 230 on the top surface of the disk-shaped element 400 additionally forms part of the open-ended fluid tight passageway.

The mid-plate assembly 140 can include hollowed volume 430 (e.g., one or more segments) through the disk-shaped element 400. The hollowed volume 430 forms a portion of the closed-ended fluid tight passageway between the temperature sensor element 170 in the tubular element 165 and the electronic circuitry 120. In one embodiment, at least a portion of the hollowed volume is a bore whose axis is generally orthogonal to a lengthwise axis of the tubular element.

As shown, and as previously discussed, the disk-shaped element 400 can include a notch 420 on a circumferential edge into which an end of the hollowed volume 430 terminates. The temperature sensor element 170 resides at an end of the tubular element 165. Conductive links 160 extend from the temperature sensor element 170, through the tubular element 165 and the hollowed volume 430 in the disk-shaped element 400, through the notch 420 and on the path adjacent the rectangular-shaped ceramic pressure sensor element 130 to the electronic circuitry 120.

FIG. 5 is an example cutaway side view of a mid-plate assembly according to embodiments herein.

As previously discussed, the mid-plate assembly 140 includes a disk-shaped element 400 and a hollow probe element (e.g., tubular element 165). The disk-shaped element 400 includes a top surface and a bottom surface plane that are disposed substantially parallel to each other. The tubular element 165 (e.g., hollow probe element) is attached to and disposed substantially orthogonal with respect to the bottom surface plane of the disk-shaped element 400.

The disk-shaped element 400 can be formed of a solid piece of metal material into which one or more hollowed volume 245 (e.g., holes) extends from the top surface plane through the disk-shaped element 400 to the bottom surface plane to allow passage of a fluid through the disk-shaped element 400 to pressure sensor element 130 in sensor assembly 100.

In accordance with further embodiments, the disk-shaped element 400 further includes a hollowed volume 430 independent of the hollowed volume 245. At least a portion of the hollowed volume 430 extends radially outward from a region in which the end of the tubular element 165 attaches to the disk-shaped element 400 to a circumferential location of the disk-shaped element 400 such as notch 420.

A combination of the tubular element 165 (e.g., hollow probe element) and the hollowed volume 430 through the disk-shaped element 400 forms a portion of the closed-ended fluid tight passageway.

In one embodiment, the tubular element 165 fits over a protruding portion (in which the hollowed volume 430 is bored) of the disk-shaped element 400. The protruding portion extends beyond the bottom surface of the disk-shaped element 400 as shown.

Figure 6:
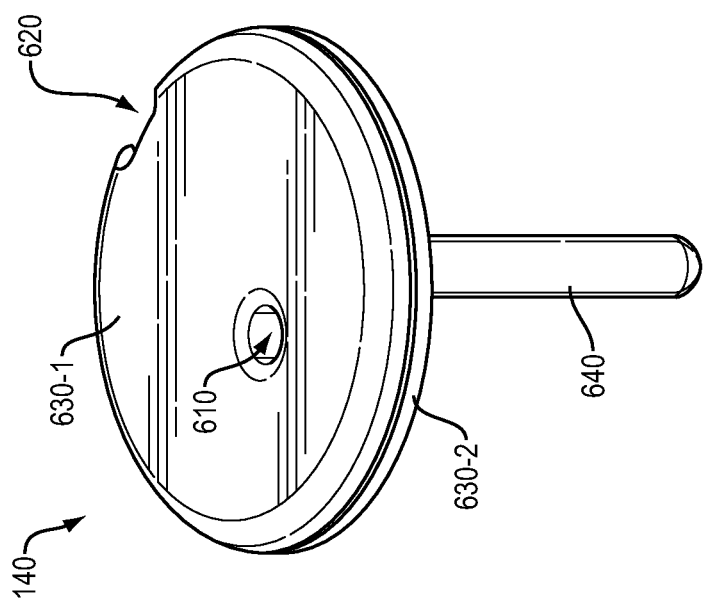
FIG. 6 is an example perspective view of a mid-plate assembly according to embodiments herein.

FIG. 6 is an example perspective view of another mid-plate assembly according to embodiments herein.

In accordance this embodiment, the sensor assembly 100 includes a mid-plate assembly 140 comprising a first disk-shaped element 630-1 and a second disk-shaped element 630-2. A combination of the disk-shaped elements 630 forms the mid-plate assembly 140.

The first disk-shaped element 630-1 can include a hole 610 therethrough. The second disk-shaped element 630-2 also can include a hole 610 and a probe 640 disposed substantially orthogonal to a surface plane of the first disk-shaped element 630-1 as shown.

In a similar manner as previously discussed, the disk-shaped element 630 of the mid-plate assembly 140 can be disposed in the sensor assembly 140 between the rectangular-shaped ceramic pressure sensor element 130 and the end of the portal opening 175 of the sensor assembly 100.

In one embodiment, the first disk-shaped element 630-1 and the second disk-shaped element 630-2 are formed via stamped material such as stainless steel, aluminum, brass, copper, etc.

The probe 640 in the second disk-shaped element 630-2 can be formed based on reshaping, stretching, stamping, drawing, etc., a portion of the material in the disk-shaped element 630-1. This provides for a single piece construction for second disk-shaped element 630-2 and probe 640.

Figure 7:
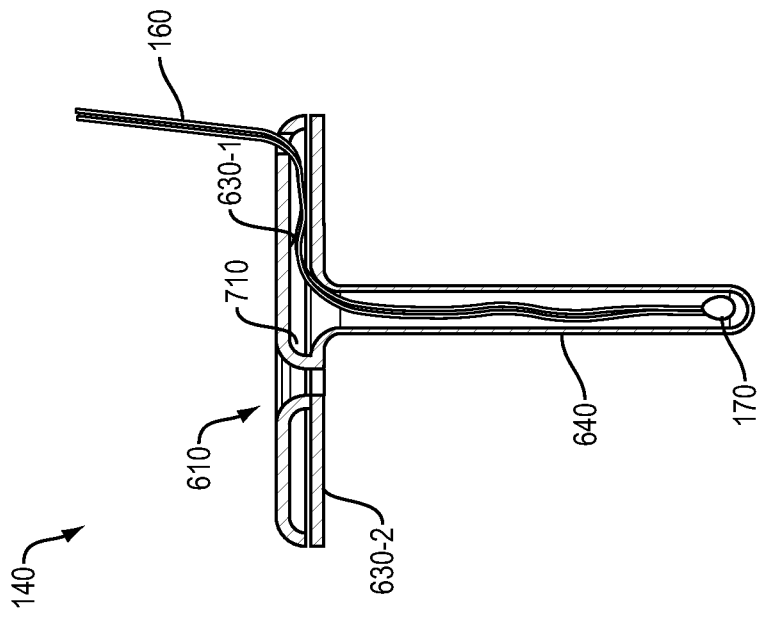
FIG. 7 is an example cross-section view of a mid-plate assembly according to embodiments herein.

FIG. 7 is an example cutaway side view of another mid-plate assembly according to embodiments herein.

The mid-plate assembly 140 can be formed via attaching the disk-shaped element 630-1 to the disk-shaped element 630-2. In such an embodiment, because the disk-shaped element 630-1 is concave, the mid-plate assembly 140 includes a spacing 710 (e.g., hollowed volume) between the first disk-shaped element 630-1 and the second disk-shaped element 630-2. As previously discussed, each of the first disk-shaped element 630-1 and the second disk-shaped element 630-2 can include a hole 610 forming part of the open-ended fluid tight passageway.

As mentioned, the temperature sensor element 170 can be disposed in the probe 640. In one embodiment, the probe 640 and the spacing 710 between disk elements 630 form at least part of the closed-ended fluid tight passageway as discussed above.

Figure 8:
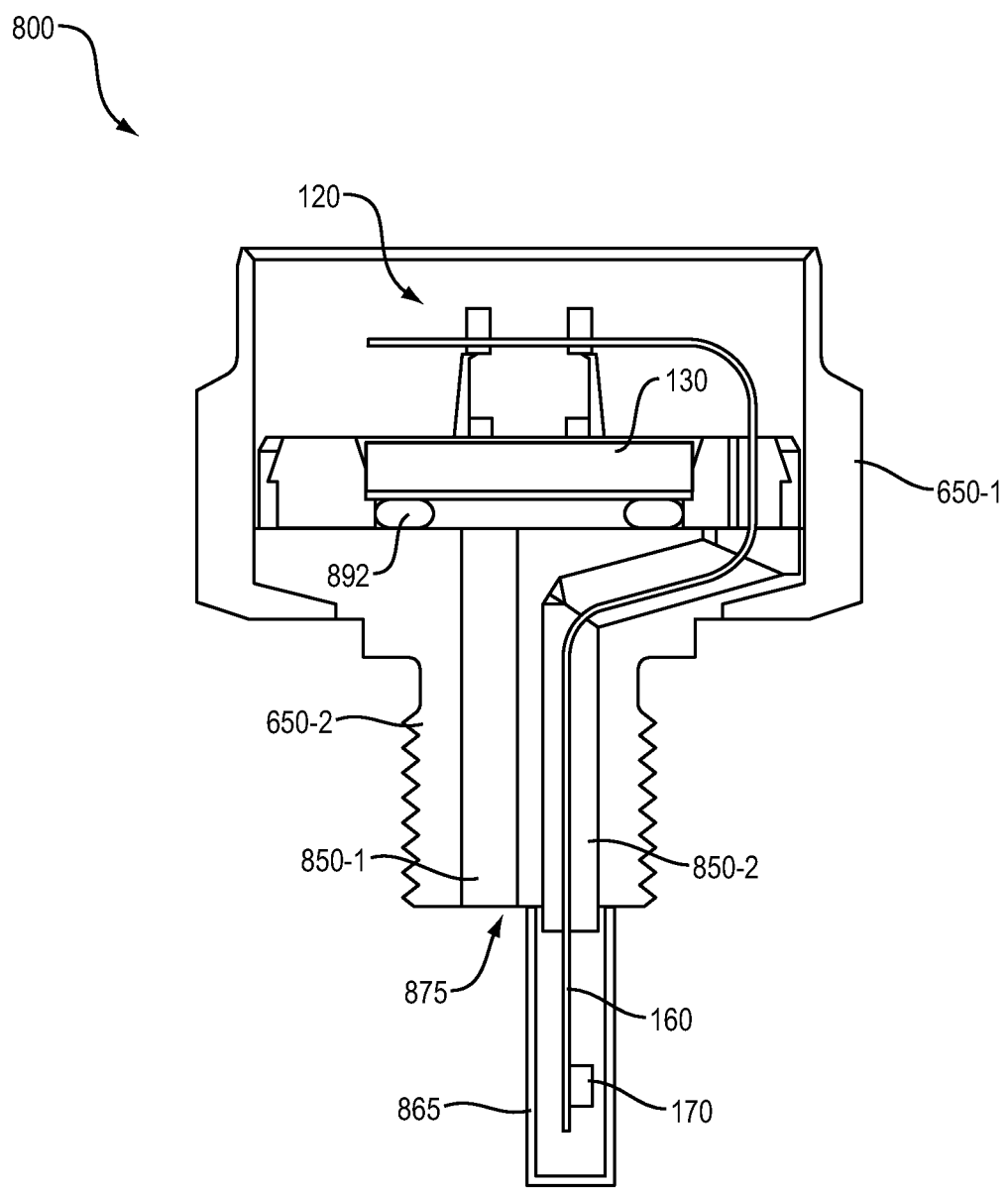
FIG. 8 is an example cross-section diagram illustrating a sensor assembly and respective component according to embodiments herein.

FIG. 8 is an example cutaway diagram illustrating a sensor assembly and respective component according to embodiments herein.

As shown, sensor assembly 800 includes a threaded base component 650-2 in which to attach the sensor assembly 800 to a resource such as an engine block. Sensor assembly 800 further includes base component 650-1 including a hollowed volume in which to house components of sensor assembly such as electronic circuitry 120, pressure sensor element 130, o-ring 892, etc.

A hollowed volume 850-1 and hollowed volume 850-2 are made in base component 650-2. The base component 650-2 can be welded to base component 650-1 to form a single base component 650.

Base component 650-1 can be made of any suitable material such as aluminum, stainless steel, etc. Base component 650-2 can be made of any suitable material such as aluminum, stainless steel, etc.

As shown, the threaded base component 650-2 includes at least a first hollowed volume 850-1 and a second hollowed volume 850-2. The first hollowed volume 850-1 in base component 650-2 forms part of the open-ended fluid tight passageway conveying the fluid form portal opening 875 to the sensing surface of the pressure sensor element 130. The second hollowed volume 850-2 in base component 650-2 forms part of the closed-ended fluid tight passageway.

In one embodiment, the first hollowed volume 850-1 is a straight cylindrical bore or path extending from the portal opening 875 of the sensor assembly 800 towards the surface of the rectangular-shaped pressure sensor element 130. Thus, the first hollowed volume 850-1 conveys the fluid from the portal opening 875 to the rectangular-shaped pressure sensor element 130.

The second hollowed volume 850-2 is a multi-segmented path including a first segment that is substantially parallel to the hollowed volume 850-1. In other words, at least a portion of the hollowed volume 850-2 is parallel to the hollowed volume 850-1. The hollowed volume 850-2 further includes at least a second segment that diverts the second hollowed volume 850-2 radially outwards from a center of the base component 650-2 as shown in FIG. 8. A probe section 865 is attached to the end of the second hollowed volume 850-2 nearest the portal opening 875. In one embodiment, the probe section 865 extends the closed-ended fluid tight passageway beyond the first hollowed volume 850-1 or portal opening 875.

Figure 9:
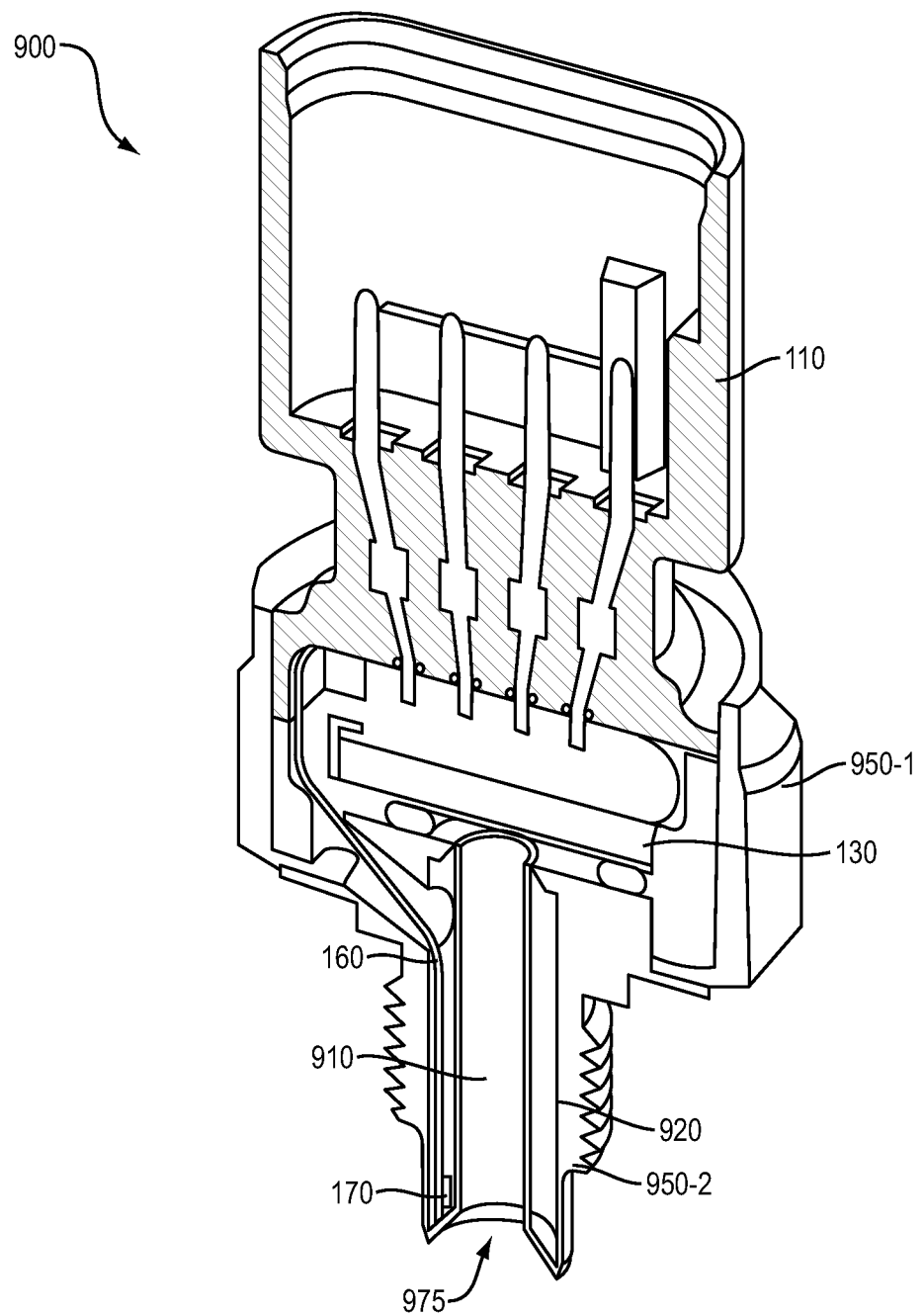
FIG. 9 is an example cutaway perspective view of a sensor assembly according to embodiments herein.

FIG. 9 is an example cutaway perspective view of a sensor assembly according to embodiments herein.

As shown, sensor assembly 900 includes male-threaded base component 950-2. A first end of the male threaded base component 950-2 includes the portal opening 975 and a circular cylindrical bore. The sensor assembly 900 further includes a tubular section 910 (e.g., a tube made from metal or other suitable material) residing within the cylindrical bore. The outer diameter of the tubular section is substantially smaller than an inner diameter of the cylindrical bore of the base component 950-2.

A combination of a surface of the circular or cylindrical bore at the first end of the male-threaded base component 950-2 and an outer surface of the tubular section 910 form at least part of a closed-ended fluid tight passageway 920 in this example embodiment.

For example, in one embodiment, the closed-ended fluid tight passageway includes the hollowed volume formed between the outer surface of the tubular section 910 and the inner surface of the cylindrical bore of base component 950-2. Temperature sensor element 170 resides within the hollowed volume formed between these walls.

The tubular section 910 can be welded at appropriate contact points of base component 950-2 to form a fluid-tight seal and prevent fluid received at portal opening 975 from contacting temperature sensor element 170 residing within the hollowed volume. In a similar manner as previously discussed, conductive links 160 provide electrical connectivity between the temperature sensor element 170 and the electronic circuitry 120. However, in this example embodiment, the conductive links 160 reside and extend along the space between the outer surface of the tubular section 910 and the inner surface of the cylindrical bore in the base component 950-2 and are not exposed to fluid received at portal opening 975.

Accordingly, an inner surface of the tubular section 910 forms at least part of the open-ended fluid tight passageway.

A second portion or end of the male-threaded base component 950-1 includes a hollowed volume or cup (e.g., a circular-bored hollowed volume) in which to house at least the electronic circuitry 120, rectangular-shaped pressure sensor element 130, etc.

Note again that techniques herein are well suited for use in any type of sensor application such as pressure sensor assemblies as discussed herein. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A sensor assembly comprising:
   a rectangular-shaped pressure sensor element to sense a pressure of a fluid;
   electronic circuitry coupled to receive a signal from the rectangular-shaped pressure sensor element;
   an open-ended fluid-tight passageway in which to convey the fluid from a portal opening of the sensor assembly to a surface of the rectangular-shaped pressure sensor element that senses the pressure;
   a closed-ended fluid-tight passageway, at least a portion of which fabricated from metal and a part of which is generally parallel to the open ended fluid-tight passageway, the closed-ended fluid tight passageway extending at least from the portal opening of the sensor assembly to the electronic circuitry on at least a portion of a path adjacent to the rectangular-shaped pressure sensor element; and
   a temperature sensor element disposed in an end of the closed-ended fluid-tight passageway nearer the portal opening, at least one conductive link disposed in the closed-ended fluid tight passageway electrically coupling the temperature sensor element to the electronic circuitry.

2. The sensor assembly as in claim 1 further comprising:
   thermally conductive filling disposed in at least a portion of the closed-ended fluid-tight passageway, the thermally conductive filling providing a thermally conductive path between the temperature sensor element and the end of the closed-ended fluid-tight passageway in which the temperature sensor element resides.

3. The sensor assembly as in claim 1, wherein an external surface of the end of the closed-ended fluid tight passageway is exposed to fluid; and
   wherein the closed-ended fluid tight passageway prevents the electronic circuitry, the at least one conductive link, and the electronic circuitry from being exposed to the fluid.

4. The sensor assembly as in claim 1, wherein the closed-ended fluid tight passageway includes a hollowed metal probe in which the temperature sensor element resides, the hollowed metal probe preventing exposure of the temperature sensor element inside of the tube to the fluid.

5. The sensor assembly as in claim 4, wherein an end of the hollowed metal probe in which the temperature sensor element resides extends beyond the portal opening of the sensor assembly such that the temperature sensor element in the hollowed metal probe detects a temperature of the fluid sample at a location external to the open-ended fluid tight passageway.

6. The sensor assembly as in claim 5 further comprising:
   a threaded base component, a first end of the threaded base component including the portal opening and a circular bore in which to receive and convey the fluid to the rectangular-shaped pressure sensor element, the circular bore at the first end of the threaded base component forming at least part of the open-ended fluid tight passageway, a second end of the threaded base component including a circular-bored hollowed volume in which to house at least the electronic circuitry and the rectangular-shaped pressure sensor element; and
   wherein at least a portion of the hollowed metal probe resides in and extends through the circular bore at the first end of the threaded base component.

7. The sensor assembly as in claim 1, wherein the rectangular-shaped pressure sensor element is less than 15 millimeters by 13 millimeters in size.

8. The sensor assembly as in claim 1 further comprising:
   a mid-plate assembly including a combination of at least a disk-shaped element and a tubular element, the tubular element disposed substantially orthogonal to surface planes of the disk-shaped element in the mid-plate assembly; and
   wherein the disk-shaped element of the mid-plate assembly is disposed in the sensor assembly between the rectangular-shaped pressure sensor element and the end of the portal opening of the sensor assembly.

9. The sensor assembly as in claim 8, wherein the temperature sensor element resides at an end of the tubular element in the mid-plate assembly, the at least one conductive link extending from the temperature sensor element, through the tubular element and the disk-shaped element to a location near a circumferential edge of the disk-shaped element, the at least one conductive link further extending from the circumferential edge of the disk-shaped element around the rectangular-shaped pressure sensor element to the electronic circuitry.

10. The sensor assembly as in claim 8, wherein the mid-plate assembly includes a first hollowed volume through the disk-shaped element, the first hollowed volume forming a portion of the open-ended fluid tight passageway between the portal opening and the surface of the rectangular-shaped pressure sensor element.

11. The sensor assembly as in claim 10, wherein the mid-plate assembly includes a second hollowed volume through the disk-shaped element, the second hollowed volume forming a portion of the close-ended fluid tight passageway around the pressure sense element to the electronic circuitry.

12. The sensor assembly as in claim 11, wherein at least a portion of the second hollowed volume is a bore whose axis is generally orthogonal to a lengthwise axis of the tubular element.

13. The sensor assembly as in claim 12, wherein the disk-shaped element includes a notch on a circumferential edge into which an end of the second hollowed volume terminates; and
   wherein the temperature sensor element resides at an end of the tubular element in the mid-plate assembly, the at least one conductive link extending from the temperature sensor element, through the tubular element and the second hollowed volume in the disk-shaped element, through the notch and on the path adjacent the rectangular-shaped ceramic pressure sensor element to the electronic circuitry.

14. The sensor assembly as in claim 1 further comprising:
   a mid-plate assembly comprising a first disk-shaped element and a second disk-shaped element, the first disk-shaped element including a hole, the second disk-shaped element including a hole in alignment with the hole of the first disk-shaped element and a probe disposed substantially orthogonal to a surface plane of the first disk-shaped element; and wherein the disk-shaped elements of the mid-plate assembly are disposed in the sensor assembly between the rectangular-shaped pressure sensor element and the end of the portal opening of the sensor assembly.

15. The sensor assembly as in claim 14, wherein the first disk-shaped element and the second disk-shaped element are stamped metal; and wherein the probe in the second disk-shaped element is formed based on reshaping metal in the second disk-shaped element.

16. The sensor assembly as in claim 14, wherein the mid-plate assembly includes a spacing between the first disk-shaped element and the second disk-shaped element;

wherein each of the first disk-shaped element and the second disk-shaped element include a hole forming part of the open-ended fluid tight passageway; and wherein the temperature sensor element is disposed in the probe, the probe and the spacing forming at least part of the closed-ended fluid tight passageway.

17. The sensor assembly as in claim 1 further comprising:
a threaded base component in which to attach the sensor assembly to resource, the threaded base component including a first hollowed volume and a second hollowed volume, the first hollowed volume forming part of the open-ended fluid tight passageway, the second hollowed volume forming part of the closed-ended fluid tight passageway.

18. The sensor assembly as in claim 17, wherein the first hollowed volume is a straight path extending from the portal opening of the sensor assembly towards the surface of the rectangular-shaped ceramic pressure sensor element, the first hollowed volume conveying the fluid from the portal opening to the rectangular-shaped ceramic pressure sensor element; and wherein the second hollowed volume is a multi-segmented path including a first segment that is substantially parallel to the straight path and a second segment that diverts the second hollowed volume radially outwards.

19. The sensor assembly as in claim 18 further comprising:
a probe section attached to the end of the second hollowed volume nearest the portal opening, the probe section extending the closed-ended fluid tight passageway beyond the first hollowed volume.

20. The sensor assembly as in claim 1 further comprising:
a threaded base component, a first end of the threaded base component including the portal opening and a circular bore, a combination of a surface of the circular bore at the first end of the male-threaded base component and an outer surface of the tubular section forming at least part of the closed-ended fluid tight passageway, an inner surface of the tubular section forming at least part of the open-ended fluid tight passageway, a second end of the threaded base component including a circular-bored hollowed volume in which to house at least the electronic circuitry and the rectangular-shaped pressure sensor element.

21. An apparatus comprising:
a disk-shaped element including a first surface plane and a second surface plane;
a hollow probe element, the probe element attached to and disposed substantially orthogonal with respect to the first surface plane of the disk-shaped element; and
the disk-shaped element including a first hollowed volume extending from the first surface plane to the second surface plane to allow passage of a fluid to a pressure sensor element in a sensor assembly, the disk-shaped element further including a second hollowed volume extending radially outward from the probe element to a circumferential location of disk-shaped element, a combination of the hollow probe element and the second hollowed volume being a fluid-tight passageway.

* * * * *